(12) United States Patent
Irisawa et al.

(10) Patent No.: US 7,728,300 B2
(45) Date of Patent: Jun. 1, 2010

(54) RADIATION IMAGE DETECTOR

(75) Inventors: Kaku Irisawa, Kanagawa-ken (JP); Masaharu Ogawa, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/240,949

(22) Filed: Sep. 29, 2008

(65) Prior Publication Data

US 2009/0084968 A1 Apr. 2, 2009

(30) Foreign Application Priority Data

Sep. 28, 2007 (JP) .............................. 2007-253422

(51) Int. Cl.
*G01T 1/24* (2006.01)
(52) U.S. Cl. ................................. 250/370.09
(58) Field of Classification Search ............. 250/370.09
See application file for complete search history.

(56) References Cited

U.S. PATENT DOCUMENTS

| 5,178,980 | A | * | 1/1993 | Mort et al. ............... 430/58.05 |
| 6,075,248 | A | * | 6/2000 | Jeromin et al. ......... 250/370.09 |
| 6,363,135 | B1 | * | 3/2002 | Brauers et al. ............. 378/98.8 |
| 6,885,005 | B2 | | 4/2005 | Sato et al. |
| 2007/0145313 | A1 | * | 6/2007 | Imai ........................... 250/591 |
| 2009/0084966 | A1 | * | 4/2009 | Irisawa et al. .......... 250/370.08 |

* cited by examiner

*Primary Examiner*—Constantine Hannaher
(74) *Attorney, Agent, or Firm*—Sughrue Mion, PLLC

(57) ABSTRACT

In a radiation image detector including a voltage-applied electrode, to which a voltage is applied, and a semiconductor layer for generating charges by irradiation with radiation, which are superposed one on the other, a charge injection prevention layer that covers at least the edge of the voltage-applied electrode is provided. Further, a protruding electrode is provided on the upper surface of the charge injection prevention layer in such a manner that the side surface of an edge of the protruding electrode is located on the outer side of the side surface of the edge of the voltage-applied electrode and the side surface of the other edge of the protruding electrode is located at the position of the side surface of the edge of the voltage-applied electrode or on the inner side thereof.

16 Claims, 11 Drawing Sheets

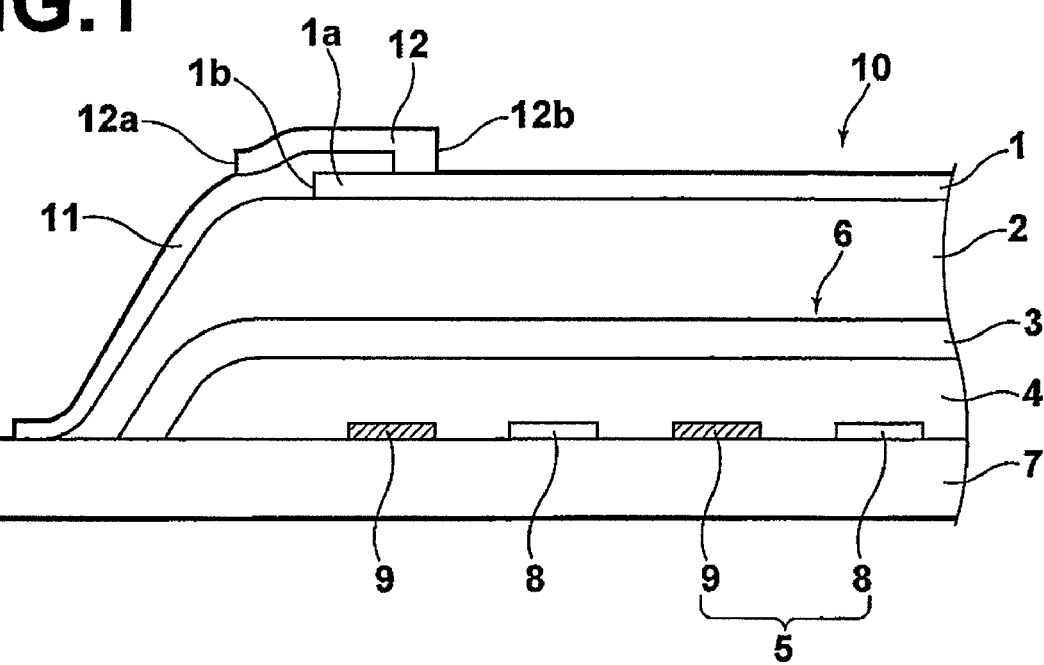
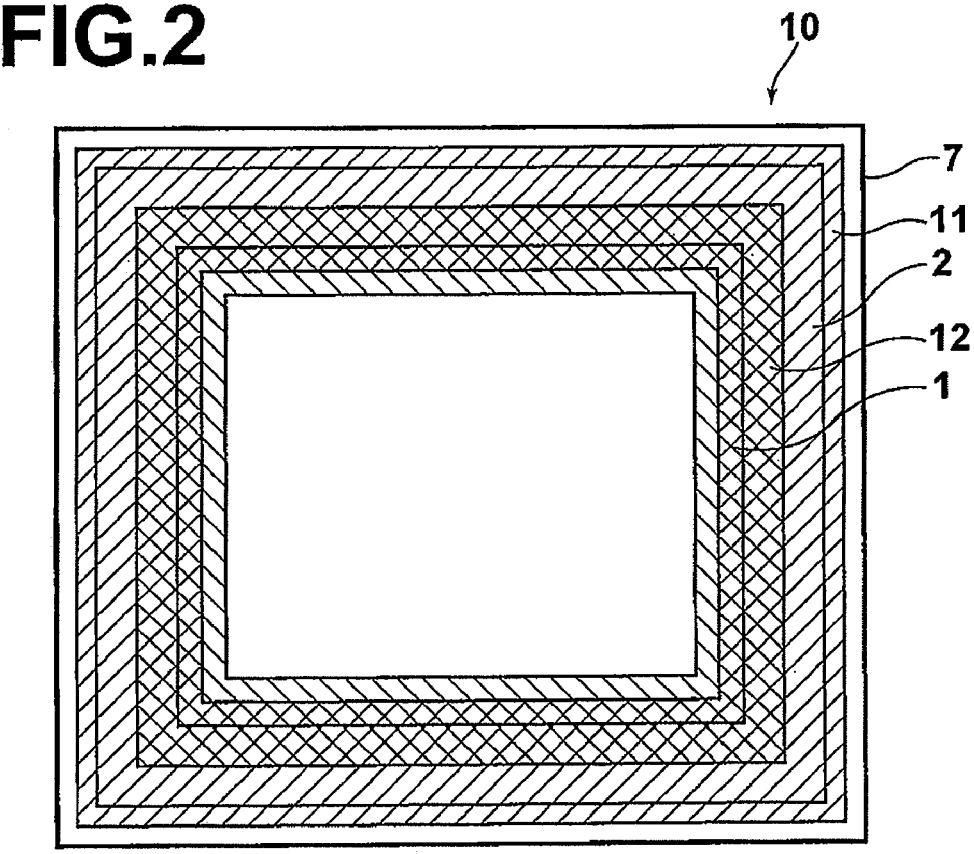

RADIATION IMAGE DETECTOR

BACKGROUND OF THE INVENTION

1. Field of the Invention

The present invention relates to a radiation image detector that records a radiation image by generating charges by irradiation with radiation and by storing (accumulating) the charges.

2. Description of the Related Art

Conventionally, in the medical field or the like, various types of radiation image detectors that record radiation images (radiographic images) of subjects by irradiation with radiation that has passed through the subjects have been proposed and used.

One of the examples of the radiation image detectors is a radiation image detector using amorphous selenium, which generates charges by irradiation with radiation. As such a radiation image detector, a light-readout-type radiation image detector and an electric-readout-type radiation image detector have been proposed.

As the radiation image detector of the light-readout-type, a radiation image detector as illustrated in FIG. 20 has been proposed, for example. In the radiation image detector, a first electrode layer 101, a photoconductive layer 102 for recording, a charge transfer layer 103, a photoconductive layer 104 for readout, a second electrode layer including a transparent linear electrode 106 and a light-shield linear electrode 107 are superposed one on another in this order. The first electrode layer 101 transmits radiation that carries a radiation image, and the photoconductive layer 102 for recording generates charges by irradiation with the radiation that has passed through the first electrode layer 1. The charge transfer layer 103 acts as an insulator for charges having one of the polarities of the charges generated in the photoconductive layer 102 for recording and acts as a conductor for charges having the other polarity. The photoconductive layer 104 for readout generates charges by irradiation with readout light. The transparent linear electrode 106 transmits the readout light and the light-shield linear electrode 107 blocks the readout light.

When a radiation image is recorded in a light-readout-type radiation image detector, as described above, first, a negative voltage is applied to the first electrode layer 101 of the radiation image detector by a high-voltage power source. Then, while the negative voltage is applied, radiation that has been transmitted through a subject, and which carries a radiation image of the subject, is output to the radiation image detector from the first electrode layer 101 side.

Then, the radiation that has been output to the radiation image detector passes through the first electrode layer 101 and irradiates the photoconductive layer 102 for recording. Then, dipoles (pairs of charges, electrons and holes) are generated in the photoconductive layer 102 for recording by irradiation with the radiation. The positive charges of the dipoles combine with negative charges charged in the first electrode 101 and disappear. The negative charges of the dipoles are accumulated, as latent image charges, in a charge storage portion 105 that is formed at the interface between the photoconductive layer 102 for recording and the charge transfer layer 103, and a radiation image is recorded (please refer to FIG. 20).

Next, while the first electrode layer 101 is set in a grounded state, readout light is output to the radiation image detector from the second electrode layer side. The readout light is transmitted through the transparent linear electrode 106 and irradiates the photoconductive layer 104 for readout. Positive charges generated in the photoconductive layer 104 for readout by irradiation with the readout light combine with the latent image charges in the charge storage portion 105. Further, an electric current that flows when negative charges combine with positive charges charged in the transparent linear electrode 106 and the light-shield linear electrode 107 is detected by a charge amplifier connected to the light-shield linear electrode 107. Accordingly, an image signal corresponding to the radiation image is read out.

When a radiation image is recorded in a radiation image detector, as described above, a negative voltage is applied to the first electrode layer 101. At this time, an electric field is concentrated in the vicinity of the edge of the first electrode layer 101. Therefore, charges are injected from the first electrode layer 101 into the photoconductive layer 102 for recording. Hence, there has been a problem that fluctuation in the density tends to occur at the edge portion of the radiation image. Further, there has been a risk of discharge breakdown by creeping discharge at the edge portion of the first electrode layer 101.

Meanwhile, as the radiation image detector of the electric-readout-type, a radiation image detector in which an upper electrode, to which a voltage is applied, a semiconductor layer and an active matrix substrate are superposed one on another has been proposed, for example. The semiconductor layer generates charges by irradiation with radiation. Further, in the active matrix substrate, a multiplicity of pixels, each including a collection electrode, a storage capacity and a TFT switch, are two-dimensionally arranged. The collection electrode collects the charges generated in the semiconductor layer. The storage capacity stores the charges collected by the collection electrode, and the TFT switch is used to read out the charges stored in the storage capacity.

When a radiation image is recorded in the radiation image detector of the electric-readout-type, as described above, first, a positive voltage is applied to the upper electrode of the radiation image detector by a voltage source. Then, while the positive voltage is applied to the upper electrode, radiation that has passed through a subject, and which carries a radiation image of the subject, is output to the radiation image detector from the upper-electrode side.

The radiation that has been output to the radiation image detector is transmitted through the upper electrode, and the semiconductor layer is irradiated with the radiation. Then, dipoles are generated in the semiconductor layer by irradiation with the radiation. Negative charges of the dipoles combine with positive charges charged in the upper electrode and disappear, and positive charges of the dipoles are collected, as latent image charges, by the collection electrode of each pixel in the active matrix substrate. Further, the positive charges are stored in each storage capacity, and the radiation image is recorded.

Then, the TFT switch of the active matrix substrate is turned on based on a control signal output from a gate driver, and the charges stored in the storage capacity are read out. The charge signals of the charges are detected by a charge amplifier. Consequently, image signals corresponding to the radiation image are read out.

However, in the radiation image detector of the electric-readout-type, when the positive voltage is applied to the upper electrode as described above, concentration of an electric field in the vicinity of the edge portion of the upper electrode occurs. Therefore, charges are injected from the upper electrode into the semiconductor layer. Hence, there has been a problem that fluctuation in the density tends to occur at the edge portion of the radiation image. Further, there has been a risk of discharge breakdown by creeping discharge at the edge portion of the upper electrode.

U.S. Pat. No. 6,885,005 proposes a radiation image detector using amorphous selenium. In the radiation image detector, an insulating material that has high withstand-voltage is formed between the edge portion of the voltage-applied electrode, to which a voltage is applied, and the semiconductor layer to prevent injection of charges and discharge breakdown as described above.

However, when the insulating material is provided between the edge portion of the voltage-applied electrode and the semiconductor layer, as in the radiation image detector disclosed in U.S. Pat. No. 6,885,005, it is impossible to form a sufficient electric field in the semiconductor layer that corresponds to the area in which the insulating material has been provided. Therefore, it is impossible to generate sufficient charges and to read out sufficient image signals. In other words, it is impossible to use the area as an image area. Consequently, there has been a problem that the image area becomes small.

SUMMARY OF THE INVENTION

In view of the foregoing circumstances, it is an object of the present invention to provide a radiation image detector that can sufficiently suppress injection of charges from a voltage-applied electrode into a semiconductor layer and that can prevent discharge breakdown by creeping discharge at the edge portion of the voltage-applied electrode without reducing the size of the image area.

A radiation image detector of the present invention is a radiation image detector comprising:

a voltage-applied electrode, to which a voltage is applied;

a semiconductor layer for generating charges by irradiation with radiation; and an electrode for detecting an electric signal corresponding to the dose of the radiation, which are superposed one on another, the radiation image detector further comprising:

a charge injection prevention layer that covers at least the edge of the voltage-applied electrode; and a protruding electrode provided on the upper surface of the charge injection prevention layer, wherein the side surface of an edge of the protruding electrode (projecting electrode) is located on the outer side of the side surface of the edge of the voltage-applied electrode and the side surface of the other edge of the protruding electrode is located at the position of the side surface of the edge of the voltage-applied electrode or on the inner side thereof.

In the radiation image detector of the present invention, the protruding electrode may be provided along the outer circumference of the voltage-applied electrode and be in contact with the voltage-applied electrode.

Alternatively, the protruding electrode may be provided in the entire area of the voltage-applied electrode and be in contact with the voltage-applied electrode.

Alternatively, the protruding electrode may be provided along the outer circumference of the voltage-applied electrode and be not in contact with the voltage-applied electrode. Further, a voltage that has the same polarity as that of the voltage applied to the voltage-applied electrode may be applied to the protruding electrode.

Alternatively, the protruding electrode may be provided in the entire area of the voltage-applied electrode and be not in contact with the voltage-applied electrode. Further, a voltage that has the same polarity as that of the voltage applied to the voltage-applied electrode may be applied to the protruding electrode.

Further, the thickness of the charge injection prevention layer may be in the range of 1 µm to 30 µm.

Further, the charge injection prevention layer may be made of an insulating material.

Further, the charge injection prevention layer may be made of polyparaxylylene.

Further, a negative voltage may be applied to the voltage-applied electrode. Further, the charge injection prevention layer may prevent injection of electrons from the voltage-applied electrode to the semiconductor layer and transfer holes.

Further, the charge injection prevention layer may be made of a material obtained by adding a hole transfer material to an organic high polymer material.

Further, as the organic high polymer material, polycarbonate may be used.

Further, as the hole transfer material, TPD (N,N'-diphenyl-N,N'-bis-(3-methylphenyl)-1,1'-biphenyl-4,4'-dia mine) may be used.

Further, a positive voltage may be applied to the voltage-applied electrode. Further, the charge injection prevention layer may prevent injection of holes from the voltage-applied electrode to the semiconductor layer and transfer electrons.

Further, the charge injection prevention layer may be made of a material obtained by adding an electron transfer material to an organic high polymer material.

Further, as the organic high polymer material, polycarbonate may be used.

Further, as the electron transfer material, a cluster or a derivative thereof or a carbon nanotube may be used.

Further, as the carbon cluster, at least one kind of carbon cluster selected from the group consisting of fullerene $C_{60}$, fullerene $C_{70}$, fullerene oxide and derivatives thereof may be used.

Here, the "charge injection prevention layer" prevents injection of charges from the voltage-applied electrode into the semiconductor layer. The charge injection prevention layer may prevent injection of only electrons or holes of the pairs of electrons and holes. Alternatively, the charge injection prevention layer may prevent injection of both of the electrons and the holes.

According to the radiation image detector of the present invention, a charge injection prevention layer that covers at least the edge of the voltage-applied electrode is provided. Further, a protruding electrode is provided on the upper surface of the charge injection prevention layer in such a manner that the side surface of an edge of the protruding electrode is located on the outer side of the side surface of the edge of the voltage-applied electrode and the side surface of the other edge of the protruding electrode is located at the position of the side surface of the edge of the voltage-applied electrode or on the inner side thereof. Therefore, the charge injection prevention layer can prevent discharge breakdown at the edge portion of the voltage-applied electrode. Further, the protruding electrode can suppress concentration of an electric field in the vicinity of the edge portion of the voltage-applied electrode. Hence, it is possible to suppress fluctuation in the density at the edge portion of the radiation image.

When the protruding electrode is provided in the entire area of the voltage-applied electrode, it is possible to easily form the protruding electrode.

Further, when the thickness of the charge injection prevention layer is in the range of 1 µm to 30 µm, it is possible to sufficiently suppress concentration of the electric field at the edge portion of the voltage-applied electrode, as described later. Further, it is possible to sufficiently suppress injection of charges from the protruding electrode into the semiconductor layer.

BRIEF DESCRIPTION OF THE DRAWINGS

FIG. 1 is a partial sectional diagram illustrating a radiation image detector according to a first embodiment of the present invention;

FIG. 2 is a top view of the radiation image detector illustrated in FIG. 1;

DESCRIPTION OF THE PREFERRED EMBODIMENTS

Figure 3A:
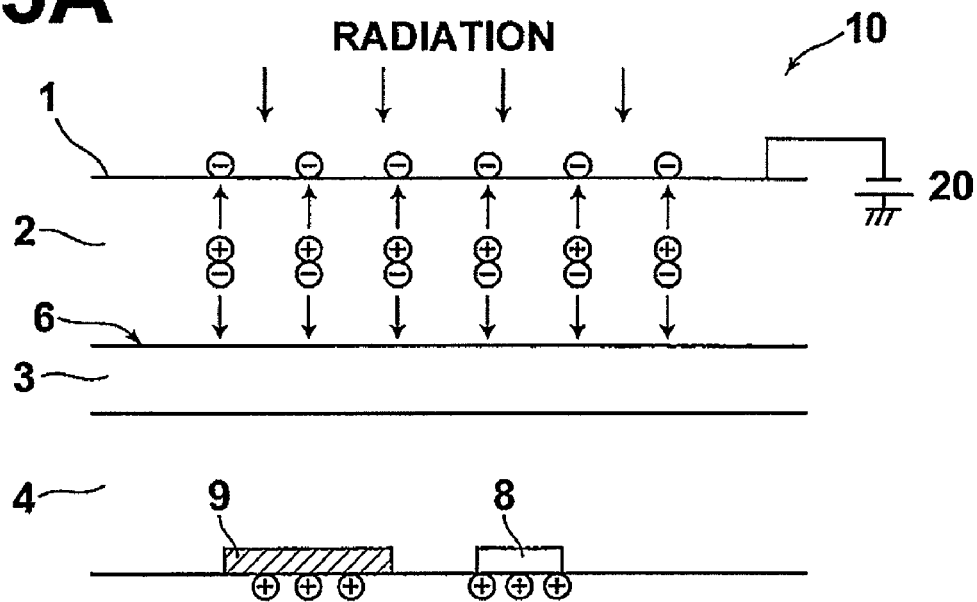
FIG. 3A is a diagram for explaining an action of recording a radiation image in the radiation image detector of the first embodiment.

Hereinafter, a first embodiment of the present invention will be described with reference to drawings. The radiation image detector of the first embodiment is a so-called light-readout-type radiation image detector. FIG. 1 is a partial sectional diagram of the radiation image detector of the first embodiment, and FIG. 2 is a top view of the radiation image detector.

As illustrated in FIGS. 1 and 2, a radiation image detector 10 of the first embodiment includes a first electrode layer 1, a photoconductive layer 2 for recording, a charge transfer layer 3, a photoconductive layer 4 for readout and a second electrode 5, which are superposed one on another in this order. The first electrode layer 1 transmits radiation that carries a radiation image. The photoconductive layer 2 for recording generates charges by irradiation with the radiation that has passed through the first electrode layer 1. The charge transfer layer 3 acts as an insulator with respect to charges that have one of the polarities of the charges generated in the photoconductive layer 2 for recording and acts as a conductor for charges that have the other polarity. The photoconductive layer 4 for readout generates charges by irradiation with readout light. Further, a charge storage portion 6 for storing charges generated in the photoconductive layer 2 for recording is formed in the vicinity of the interface between the photoconductive layer 2 for recording and the charge transfer layer 3. Each of the aforementioned layers is formed on a glass substrate 7 from the second electrode layer 5 side. The first electrode layer 1 corresponds to the voltage-applied electrode recited in the claims of the present application.

The first electrode layer 1 should transmit radiation. For example, Nesa film ($SnO_2$), ITO (Indium Tin Oxide), IZO (Indium Zinc Oxide), IDIXO (Idemitsu Indium X-metal Oxide; Idemitsu Kosan Co., Ltd.), which is an amorphous-type light-transmissive oxide film, or the like that has a thickness of 50 to 200 nm may be used as the first electrode layer 1. Alternatively, Al, Au or the like having a thickness of 100 nm may be used as the first electrode layer 1.

The second electrode layer 5 includes a plurality of transparent linear electrodes 8, which transmit readout light, and a plurality of light-shield linear electrodes 9, which block the readout light. Further, as illustrated in FIG. 1, the transparent linear electrodes 8 and the light-shield linear electrodes 9 are alternately arranged in parallel to each other with a predetermined distance therebetween. FIG. 1 is a sectional diagram with respect to a direction orthogonal to the length direction of the transparent linear electrodes 8 and the light-shield linear electrodes 9.

The transparent linear electrodes 8 are made of a material that transmits the readout light and that has electrical conductivity. The transparent linear electrodes 8 may be made of any material that has such properties. For example, ITO, IZO or IDIXO may be used like the first electrode layer 1. Alternatively, the transparent linear electrodes 8 may be made of metal, such as Al and Cr, that is sufficiently thin to transmit the readout light (for example, approximately 10 nm).

The light-shield linear electrodes 9 are made of a material that blocks the readout light and has electrical conductivity. The light-shield linear electrodes 9 may be made of any material that has such properties. For example, Cr, Mo or W that has a thickness of 100 to 300 nm may be used. Alternatively, a light-shield layer made of a resist material may be patterned in stripe form in advance. Further, a material that is the same as the material of the transparent linear electrodes may be patterned in stripe form on the light-shield layer to make the obtained patterns function as light-shield electrodes.

The photoconductive layer 2 for recording should generate charges by irradiation with radiation. As the photoconductive layer 2 for recording, a material that contains a-Se as a main component is used. The properties of a-Se are excellent in that it has relatively high quantum efficiency with respect to radiation, high dark resistance and the like. The appropriate thickness of the photoconductive layer 2 for recording is approximately 500 μm.

As the charge transfer layer 3, a material that has a large difference between the mobility of charges charged in the first electrode layer 1 at the time of recording of radiation images and the mobility of charges that have the opposite polarity should be used, for example. A material that has a larger difference in the mobility is more appropriate as the material of the charge transfer layer 3 (for example, greater than or equal to $10^2$, and optionally, greater than or equal to $10^3$). For example, an organic compound, such as poly N-vinyl carbazole (PVK), N,N'-diphenyl-N,N'-bis-(3-methylphenyl)-[1, 1'-biphenyl]-4,4'-di amine (TPD), or discotic liquid crystal, a TPD dispersion in a polymer (polycarbonate, polystyrene and PVK), and a semiconductor material, such as a-Se and $As_2Se_3$, doped with 10 to 200 ppm Cl are appropriate as the material of the charge transfer layer 3. The appropriate thickness of the charge transfer layer 3 is approximately 0.2 to 2 µm.

As the photoconductive layer 4 for readout, a material that exhibits electrical conductivity by irradiation with the readout light or deletion light should be used. For example, a photoconductive material that contains at least one of a-Se, Se—Te, Se—As—Te, metal-free phthalocyanine, MgPc (Magnesium phthalocyanine), VoPc (phase II of Vanadyl phthalocyanine), CuPc (Copper phthalocyanine) and the like, as a main component, is appropriate as the material of the photoconductive layer 4 for readout. The appropriate thickness of the photoconductive layer 4 for readout is approximately 5 to 20 µm.

Meanwhile, in the conventional light-readout-type radiation image detector, when a radiation image is recorded as described above, high voltage is applied to the first electrode layer. At this time, concentration of an electric field occurs in the vicinity of the edge portion of the first electrode layer. Therefore, charges are injected from the first electrode layer into the photoconductive layer for recording. Hence, there has been a problem that when the radiation image is regenerated, a fluctuation in density tends to occur at the edge portion of the regenerated image. Further, there has been a risk of discharge breakdown by creeping discharge at the edge portion of the first electrode layer.

Therefore, in the radiation image detector 10 of the present embodiment, a charge injection prevention layer 11 is provided in such a manner to cover an edge portion 1a of the first electrode layer 1, as illustrated in FIGS. 1 and 2. The charge injection prevention layer 11 is provided in an area from the side surface of the photoconductive layer 2 for recording to the glass substrate 7. Further, a protruding electrode 12 is provided on the upper surface of the charge injection prevention layer 11. The protruding electrode 12 is provided in such a manner that the side surface 12a of an edge of the protruding electrode 12 is located on the outer side of the side surface 1b of an edge portion 1a of the first electrode layer 1 and the side surface 12b of the other edge of the protruding electrode 12 is located on the inner side of the side surface 1b of the edge portion 1a of the first electrode layer 1. In the present embodiment, the side surface 12b of the edge of the protruding electrode 12 is located on the inner side of the side surface 1b of the edge portion 1a of the first electrode layer 1. However, the position of the side surface 12b of the protruding electrode 12 may be the same as that of the side surface 1b of the edge portion 1a of the first electrode layer 1. Further, the charge injection prevention layer 11 should be formed on the outer side of the side surface 12a of the protruding electrode 12 in such a manner to extend at least up to the side surface 12a. It is not necessary that the charge injection prevention layer 11 completely covers the photoconductive layer 2 for recording.

The charge injection prevention layer 11 prevents concentration of an electric field at the edge portion of the first electrode layer 1. Further, the charge injection prevention layer 11 prevents injection of charges from the protruding electrode 12. As the material of the charge injection prevention layer 11, for example, when a negative voltage is applied to the first electrode layer 1 and the protruding electrode 12, a material that can prevent injection of electrons may be used. For example, polyparaxylylene, which is an insulating material, may be used. Alternatively, a material that prevents injection of electrons and that transfers holes may be used. For example, TPD (N,N'-diphenyl-N,N'-bis-(3-methylphenyl)-1, 1'-biphenyl-4,4'-dia mine) may be used. Alternatively, the TPD may be formed as a bulk layer to be functioned as the charge injection prevention layer 11. Alternatively, a material obtained by adding TPD to polycarbonate may be applied to form the charge injection prevention layer 11. When a material that transfer holes, as described above, is used as the material of the charge injection prevention layer 11 instead of the insulating material, it is possible to prevent holes that approach the first electrode layer 1 during recording of radiation images from accumulating in the photoconductive layer 2 for recording. Therefore, even if the radiation image detector is used repeatedly, it is possible to prevent discharge breakdown at the edge portion of the first electrode layer 1. Further, it is possible to prevent crystallization of the photoconductive layer 2 for recording, which is in contact with the charge injection prevention layer 11, by using an organic high polymer, such as polycarbonate, as described above.

The protruding electrode 12 is provided to prevent concentration of an electric field at the edge portion 1a of the first electrode layer 1. For example, the protruding electrode 12 may be formed by a Nesa film, ITO, IZO or IDIXO like the first electrode 1. Alternatively, the protruding electrode 12 may be made of Al, Au or the like that has a thickness of 10 nm.

Further, the protruding electrode 12 is provided along the outer circumference of the first electrode layer 1, as illustrated in shade in FIG. 2. Further, as illustrated in FIG. 1, the inner edge of the protruding electrode 12 is in contact with the first electrode layer 1. Therefore, a voltage similar to the voltage applied to the first electrode layer 1 is applied to the protruding electrode 12.

Figure 3B:
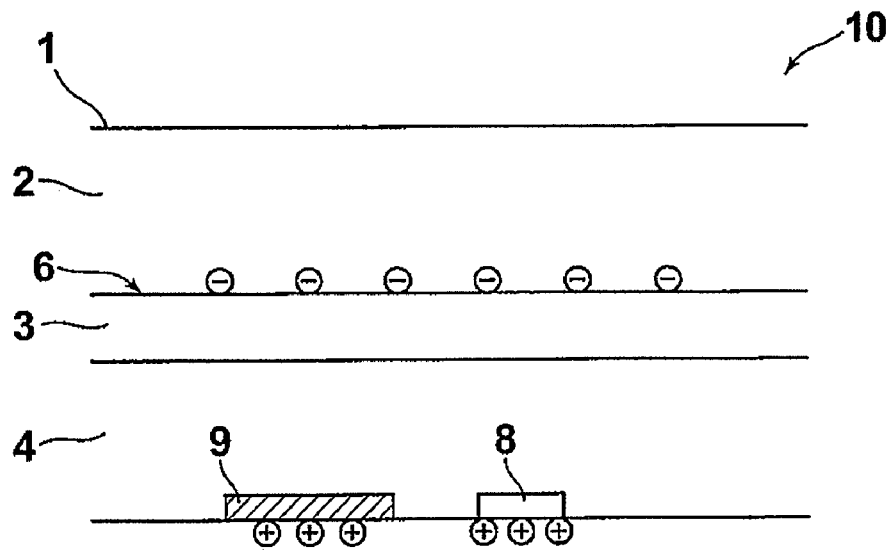
FIG. 3B is a diagram for explaining an action of recording a radiation image in the radiation image detector of the first embodiment.
Figure 4:
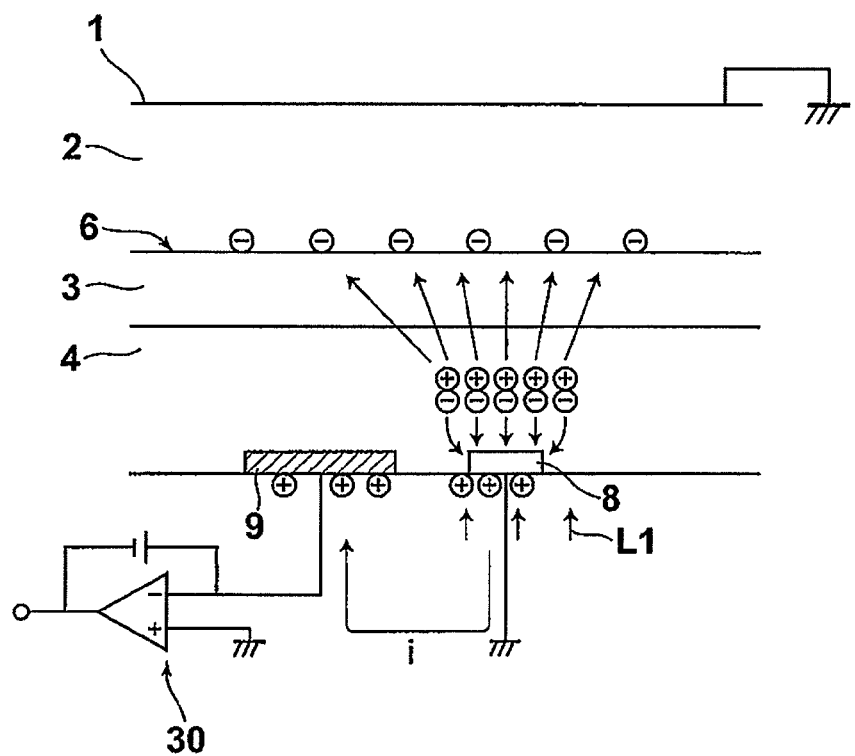
FIG. 4 is a diagram for explaining an action of reading out a radiation image from the radiation image detector of the first embodiment.

Next, the action of recording a radiation image in the radiation image detector of the first embodiment and the action of reading out the radiation image therefrom will be described with reference to FIGS. 3A, 3B and 4. In FIGS. 3A, 3B and 4, the charge injection prevention layer 11 and the protruding electrode 12 are omitted.

As illustrated in FIG. 3A, a negative voltage is applied to the first electrode layer 1 of the radiation image detector 10 by a high voltage source 20. Then, while the negative voltage is applied to the first electrode layer 1, radiation that has passed through a subject, and which carries a radiation image of the subject, is output to the radiation image detector 10 from the first electrode layer side.

Then, the radiation that has been output to the radiation image detector 10 is transmitted through the first electrode layer 1, and the photoconductive layer 2 for recording is irradiated with the radiation. Then, dipoles are generated in the photoconductive layer 2 for recording by irradiation with the radiation. The positive charges of the dipoles combine with negative charges charged in the first electrode layer 1 and disappear, and the negative charges of the dipoles are stored, as latent image charges, in the charge storage portion 6. The charge storage portion 6 is formed at the interface between the photoconductive layer 2 for recording and the charge transfer layer 3. Accordingly, the radiation image is recorded (please refer to FIG. 3B).

Next, as illustrated in FIG. 4, while the first electrode layer 1 is set in a grounded state, readout light L1 is output to the radiation image detector 10 from the second electrode layer 5 side. The readout light L1 is transmitted through the transparent linear electrode 8 and irradiates the photoconductive layer 4 for readout. Positive charges generated in the photoconductive layer 4 for readout by irradiation with the readout light L1 combine with the latent image charges in the charge storage portion 6. Further, negative charges combine with positive charges charged in the light-shield linear electrode 9 through a charge amplifier 30 connected to the light-shield linear electrode 9.

Then, an electric current flows into the charge amplifier 30 when the negative charges generated in the photoconductive layer 4 for readout and the positive charges charged in the light-shield linear electrode 9 combine with each other. The electric current is differentiated and detected as an image signal. Accordingly, readout of the image signal based on the radiation image is performed.

Figure 5:
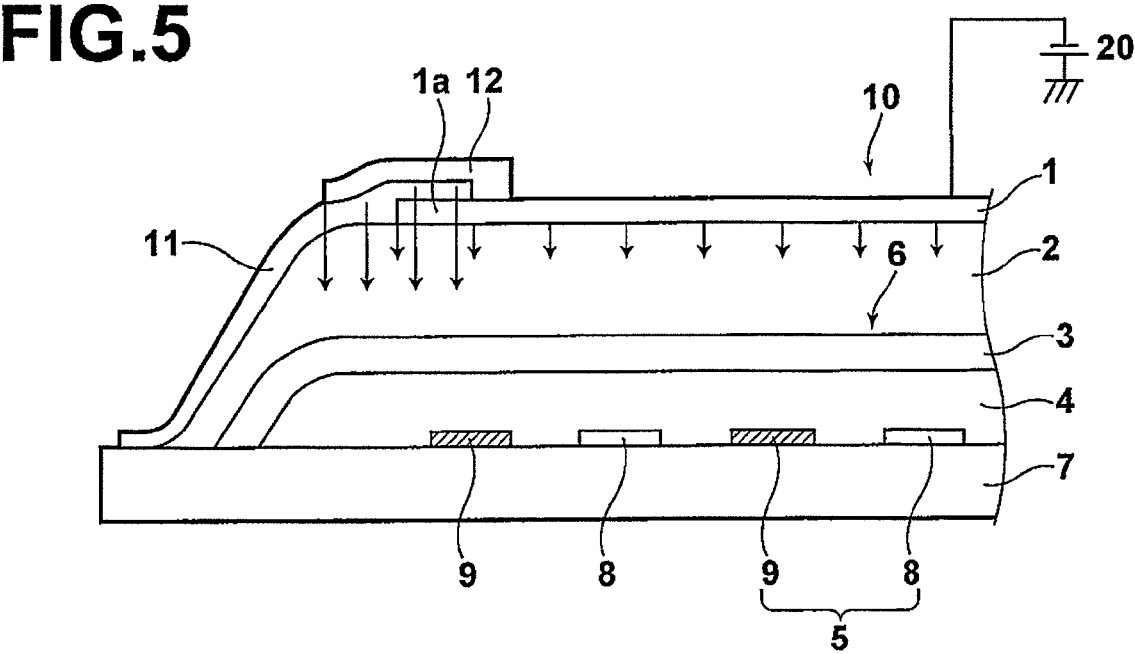
FIG. 5 is a diagram for explaining the action and effect of a protruding electrode in the radiation image detector of the first embodiment.

As illustrated in FIG. 1, the charge injection prevention layer 11 is provided in the radiation image detector 10 of the present embodiment. Therefore, it is possible to prevent discharge breakdown by creeping discharge from the first electrode layer 1. Further, since the protruding electrode 12 is provided, when a voltage is applied to the first electrode layer 1, an electric field is generated also by the protruding electrode 12, as illustrated in FIG. 5. Therefore, it is possible to suppress concentration of an electric field at the edge portion 1a of the first electrode layer 1. Therefore, it is possible to suppress injection of charges from the edge portion 1a of the first electrode layer 1. Hence, it is possible to suppress fluctuation in the density at the edge portion of the radiation image.

Figure 6:
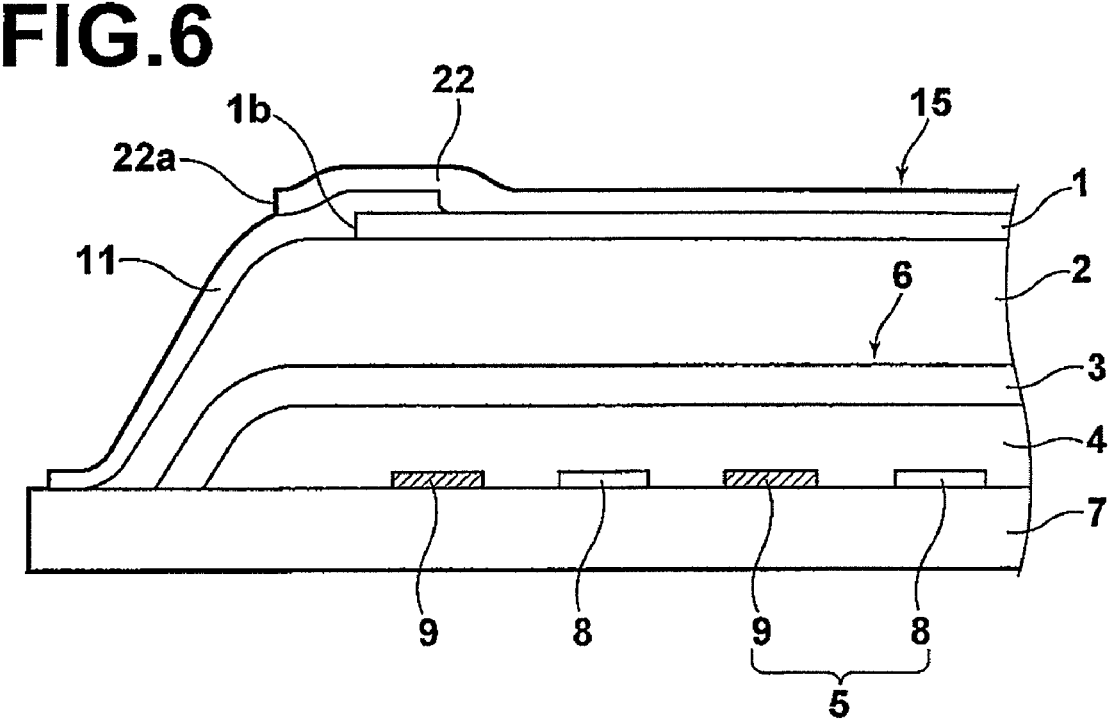
FIG. 6 is a partial sectional diagram illustrating a radiation image detector according to a second embodiment of the present invention.

Next, a second embodiment of the radiation image detector of the present invention will be described. FIG. 6 is a partial sectional diagram illustrating the radiation image detector of the second embodiment, and FIG. 7 is a top view of the radiation image detector.

In a radiation image detector 15 of the second embodiment, only the shape of a protruding electrode 22 differs from the radiation image detector 10 of the first embodiment. Other elements and structure are similar to those of the radiation image detector 10 of the first embodiment.

Figure 7:
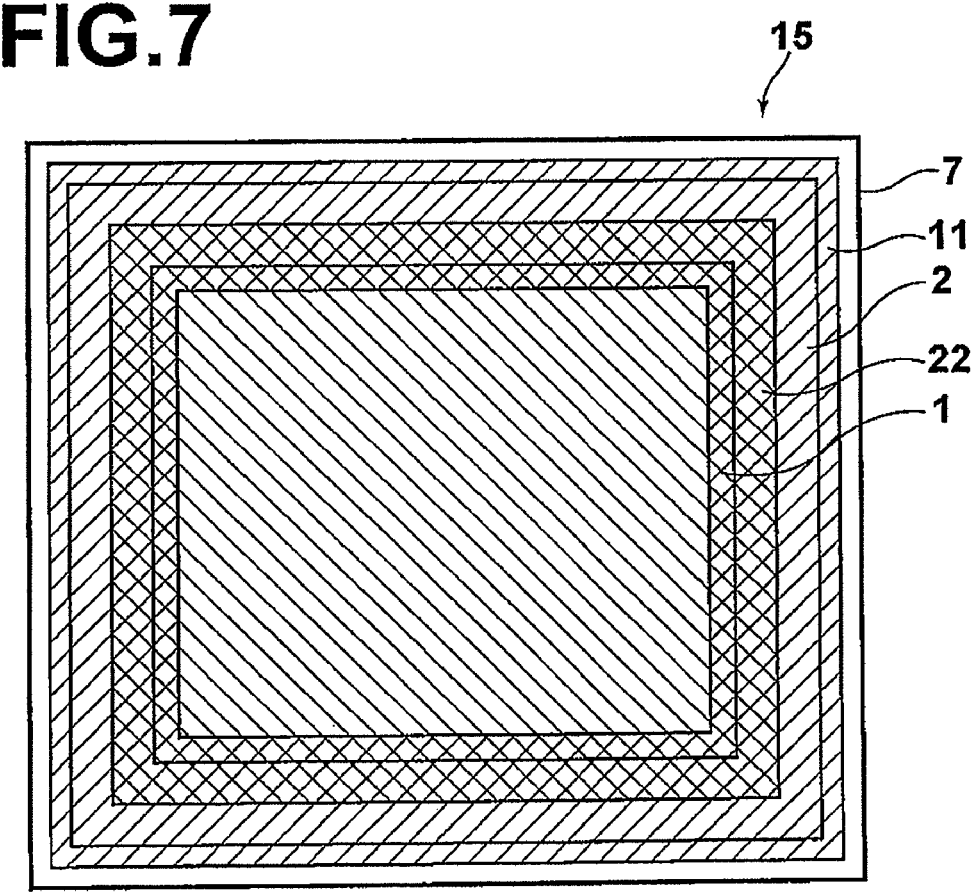
FIG. 7 is a top view of the radiation image detector illustrated in FIG. 6.

As illustrated in FIGS. 6 and 7, the protruding electrode 22 in the radiation image detector 15 of the second embodiment is provided in the entire area of the first electrode layer 1 instead of being provided only at the outer circumference of the first electrode layer 1. The side surface 22a of the edge of the protruding electrode 22 is located on the outer side of the side surface 1b of the edge of the first electrode layer 1. Further, the protruding electrode 22 is in contact with the first electrode layer 1. Therefore, a voltage that is similar to the voltage applied to the first electrode layer 1 is applied also to the protruding electrode 22. Further, the charge injection prevention layer 11 should be formed on the outer side of the side surface 22a of the protruding electrode 22 in such a manner to extend at least up to the side surface 22a. It is not necessary that the charge injection prevention layer 11 completely covers the photoconductive layer 2 for recording.

The action and effect of the charge injection prevention layer 11 and the protruding electrode 22 in the radiation image detector 15 of the second embodiment is similar to that of the radiation image detector 10 in the first embodiment. However, since the protruding electrode 22 is provided in the entire area of the first electrode layer 1 in the second embodiment, it is possible to more easily form the protruding electrode 22 than the protruding electrode 12 in the radiation image detector 10 of the first embodiment.

When the protruding electrode 12 is provided only along the outer circumference of the first electrode layer 1, in other words, the protruding electrode 12 is not provided in the area other than the outer circumference of the first electrode layer 1, as in the first embodiment, it is possible to reduce the amount of the material used to form the protruding electrode 12 of the radiation image detector 10, compared with the case of forming the protruding electrode 22 in the entire area of the first electrode layer 1 as in the second embodiment. Further, it is possible to prevent attenuation of radiation that irradiates the image formation area.

Figure 8:
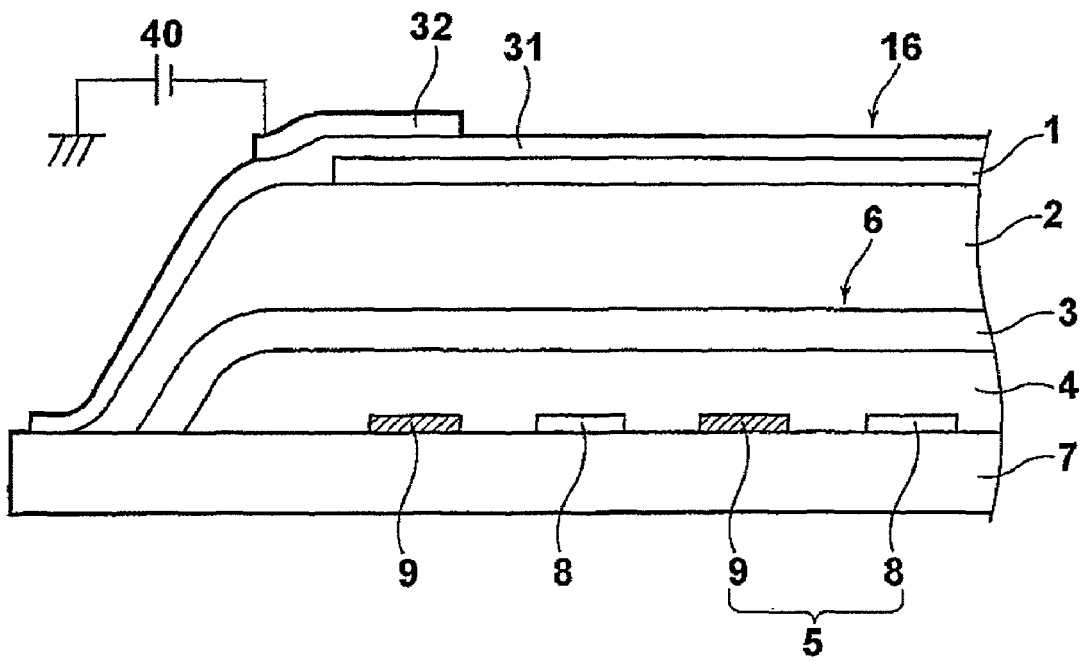
FIG. 8 is a partial sectional diagram illustrating a radiation image detector according to a third embodiment of the present invention.

Next, a third embodiment of the radiation image detector of the present invention will be described. FIG. 8 is a partial sectional diagram illustrating the radiation image detector of the third embodiment, and FIG. 9 is a top view of the radiation image detector.

In a radiation image detector 16 of the third embodiment, only the shape of a charge injection prevention layer 31 and the shape of a protruding electrode 32 differ from the radiation image detector 10 of the first embodiment. Other elements and structure are similar to those of the radiation image detector 10 of the first embodiment.

Figure 9:
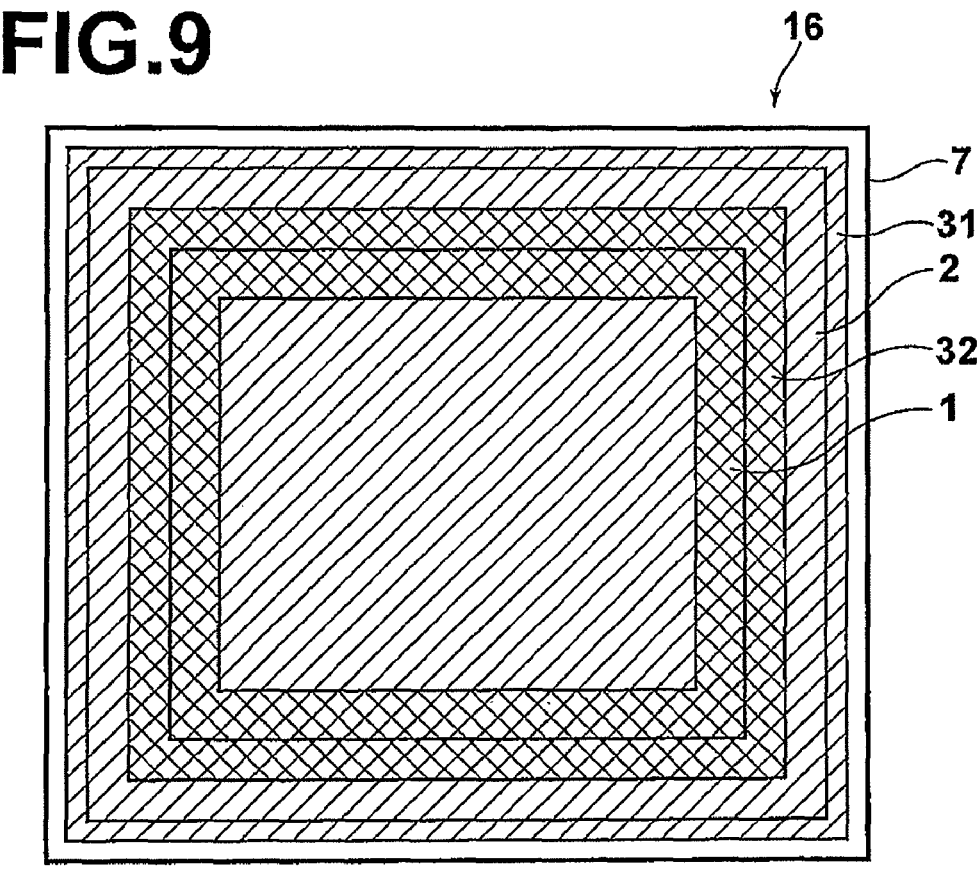
FIG. 9 is a top view of the radiation image detector illustrated in FIG. 8.

As illustrated in FIGS. 8 and 9, the charge injection prevention layer 31 of the radiation image detector 16 of the third embodiment is provided in the entire area of the first electrode layer 1 instead of being provided only at the edge portion of the first electrode layer 1. Further, the protruding electrode 32 is provided along the outer circumference of the first electrode layer 1 in a manner similar to the protruding electrode in the radiation image detector 10 of the first embodiment. Since the charge injection prevention layer 31 is provided in the entire area of the first electrode layer 1, as described above, the protruding electrode 32 and the first electrode layer 1 are not in contact with each other. When a radiation image is recorded in the radiation image detector 16 of the third embodiment, a voltage is applied to the protruding electrode 32 of the radiation image detector 16 by an external high voltage source 40. At this time, the polarity of the applied voltage is the same as that of the voltage applied to the first electrode layer 1. Further, it is desirable that the magnitude of the voltage applied to the protruding electrode 32 is 0.5 to 1.2 times as great as that of the voltage applied to the first electrode layer 1. If the voltage applied to the protruding electrode 32 is higher than this range, there is a risk that new discharge occurs. If the voltage applied to the protruding electrode 32 is lower than the range, the intensity of the electric field generated in the protruding electrode 32 becomes low. Therefore, it is impossible to achieve a sufficient effect. In the present embodiment, a voltage source for applying a voltage to the first electrode layer 1 and a voltage source for applying a voltage to the protruding electrode 32 are separately provided. Alternatively, a common voltage source may be used by the first electrode 32 and the first electrode layer 1.

The action and effect of the charge injection prevention layer 31 and the protruding electrode 32 in the radiation image detector 16 of the third embodiment is similar to that of the radiation image detector 10 in the first embodiment. Since the charge injection prevention layer 31 is provided in the entire area of the first electrode layer 1 in the third embodiment, it is possible to more easily form the radiation image detector 16 than the radiation image detector 10 of the first embodiment.

Figure 10:
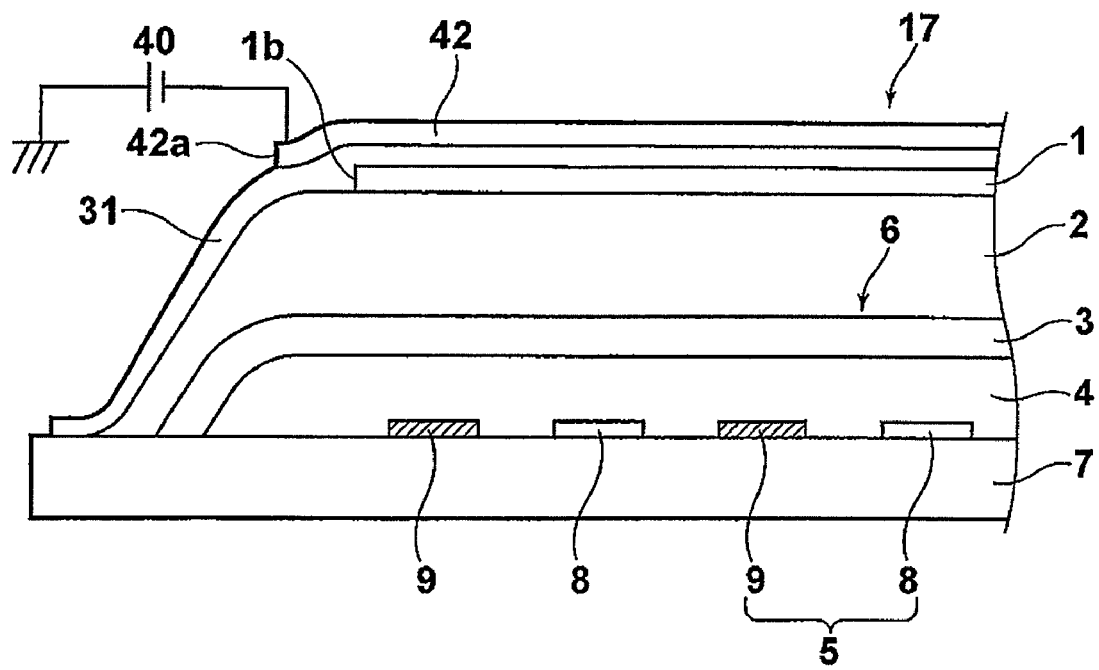
FIG. 10 is a partial sectional diagram illustrating a radiation image detector according to a fourth embodiment of the present invention.

Next, a fourth embodiment of the radiation image detector of the present invention will be described. FIG. 10 is a partial sectional diagram illustrating the radiation image detector of the fourth embodiment, and FIG. 11 is a top view of the radiation image detector.

In a radiation image detector 17 of the fourth embodiment, only the shape of a protruding electrode 42 differs from the radiation image detector 16 of the third embodiment. Other elements and structure are similar to those of the radiation image detector 16 of the third embodiment.

Figure 11:
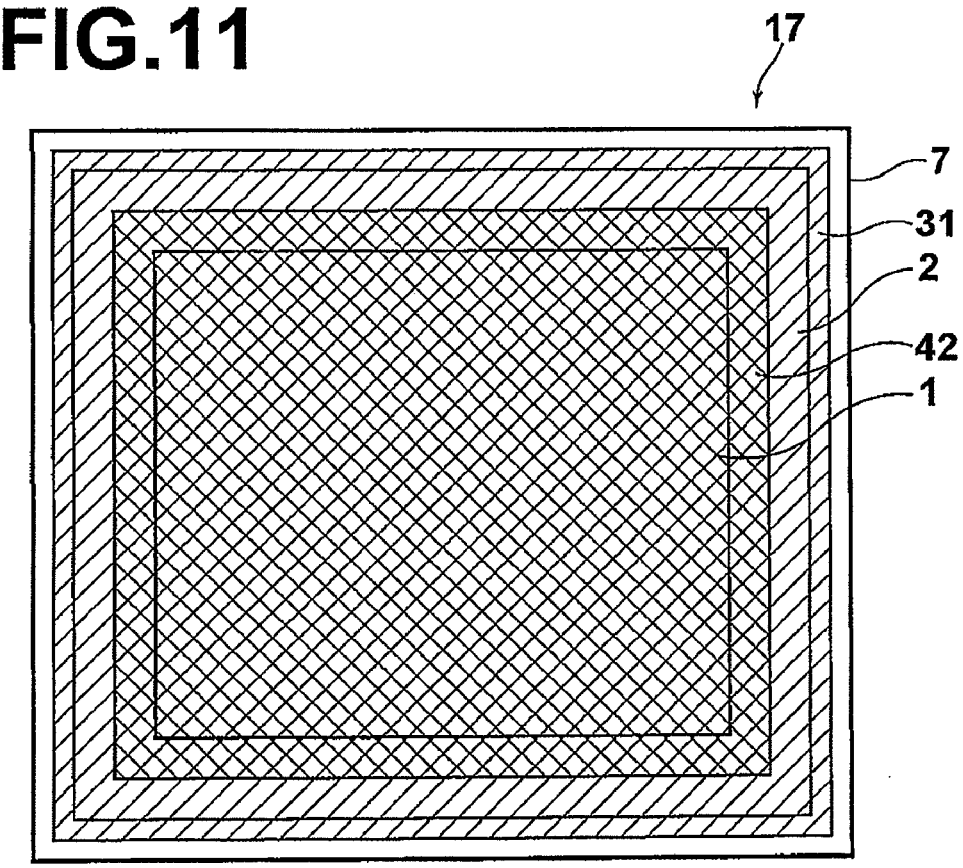
FIG. 11 is a top view of the radiation image detector illustrated in FIG. 10.

As illustrated in FIGS. 10 and 11, the protruding electrode 42 in the radiation image detector 17 of the fourth embodiment is provided in the entire area of the first electrode layer 1 instead of being provided only at the edge portion of the first electrode layer 1. Further, the side surface 42a of an edge of the protruding electrode 42 is located on the outer side of the side surface 1b of an edge of the first electrode layer 1. Further, in the radiation image detector 17 of the fourth embodiment, the charge injection prevention layer 31 is provided in the entire area of the first electrode layer 1 in a manner similar to the radiation image detector 16 of the third embodiment. Therefore, the protruding electrode 42 and the first electrode layer 1 are not in contact with each other. When a radiation image is recorded in the radiation image detector 17 of the fourth embodiment, a voltage is applied to the protruding electrode 42 of the radiation image detector 17 by an external high voltage source 40. At this time, the polarity of the applied voltage is the same as that of the voltage applied to the first electrode layer 1. Further, it is desirable that the magnitude of the voltage applied to the protruding electrode 42 is 0.5 to 1.2 times as great as that of the voltage applied to the first electrode layer 1. If the voltage applied to the protruding electrode 42 is higher than this range, there is a risk that new discharge occurs. If the voltage applied to the protruding electrode 42 is lower than the range, the intensity of the electric field generated in the protruding electrode 42 becomes low. Therefore, it is impossible to achieve a sufficient effect. Further, in the present embodiment, a voltage source for applying a voltage to the first electrode layer 1 and a voltage source for applying a voltage to the protruding electrode 42 are separately provided. Alternatively, a common voltage source may be used by the first electrode layer 42 and the first electrode layer 1.

The action and effect of the charge injection prevention layer 31 and the protruding electrode 42 in the radiation image detector 17 of the fourth embodiment is similar to that of the radiation image detector 10 in the first embodiment. However, since the charge injection prevention layer 31 and the protruding electrode 42 are provided in the entire area of the first electrode layer 1 in the fourth embodiment, it is possible to more easily form the radiation image detector 17 than the radiation image detector 10 of the first embodiment.

In the radiation image detectors of the first through fourth embodiments, a material that can prevent injection of electrons from the first electrode layer was used as the material of the charge injection prevention layer. However, in a radiation image detector, in which a positive voltage is applied to the first electrode layer during recording of a radiation image, a material that can prevent injection of holes from the first electrode layer should be used as the material of the charge injection prevention layer. The material for preventing injection of holes will be described later in detail.

Figure 12:
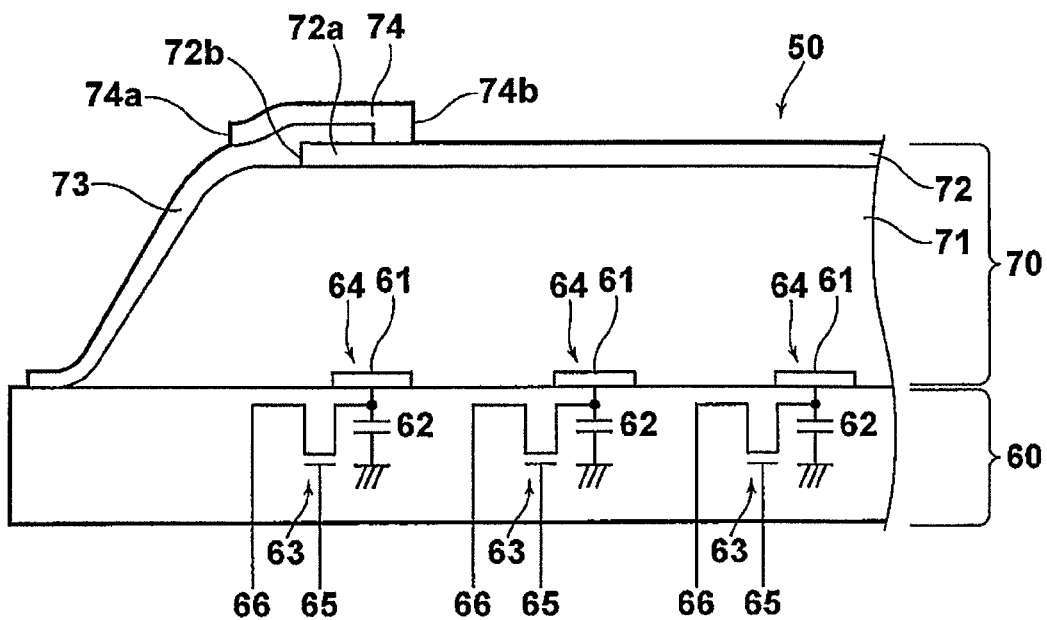
FIG. 12 is a partial sectional diagram illustrating a radiation image detector according to a fifth embodiment of the present invention.

Next, a fifth embodiment of a radiation image detector of the present invention will be described. The radiation image detector of the fifth embodiment is a so-called electric-readout-type radiation image detector. FIG. 12 is a partial sectional diagram illustrating the fifth embodiment of the radiation image detector.

As illustrated in FIG. 12, a radiation image detector 50 of the fifth embodiment includes an active matrix substrate 60 and a radiation detection unit 70, which is deposited on the active matrix substrate 60.

The radiation detection unit 70 includes a semiconductor layer 71, which is formed substantially in the entire area of the active matrix substrate 60, and an upper electrode 72, which is provided on the semiconductor layer 71. The upper electrode 72 corresponds to the voltage-applied electrode recited in the claims of the present application.

The semiconductor layer 71 has conductivity for electromagnetic waves. When the semiconductor layer 71 is irradiated with X-rays, charges are generated within the layer. As the semiconductor layer 71, an amorphous layer of a-Se that contains selenium as a main component and that has a thickness of 100 to 1000 μm may be used, for example. The semiconductor layer 71 is formed on the active matrix substrate 60 by using a vapor deposition (evaporation) method.

The upper electrode 72 is made of a low-resistance conductive material, such as Au and Al.

The active matrix substrate 60 includes a multiplicity of pixels 64, each including a collection electrode 61, a storage capacity 62 and a TFT switch 63. The collection electrode 61 collects the charges generated in the semiconductor layer 71. The storage capacity 62 stores the charges collected by the collection electrode 61, and the TFT switch 63 is used to read out the charges stored in the storage capacity 62. Further, the active matrix substrate includes a multiplicity of scan lines (wires) 65 for turning ON/OFF the TFT switches 63 and a multiplicity of data lines (wires) 66 for reading out the charges stored in the storage capacities 62.

As the TFT switch 63, a-SiTFT, which uses amorphous silicon in an active layer, is generally used.

Figure 13:
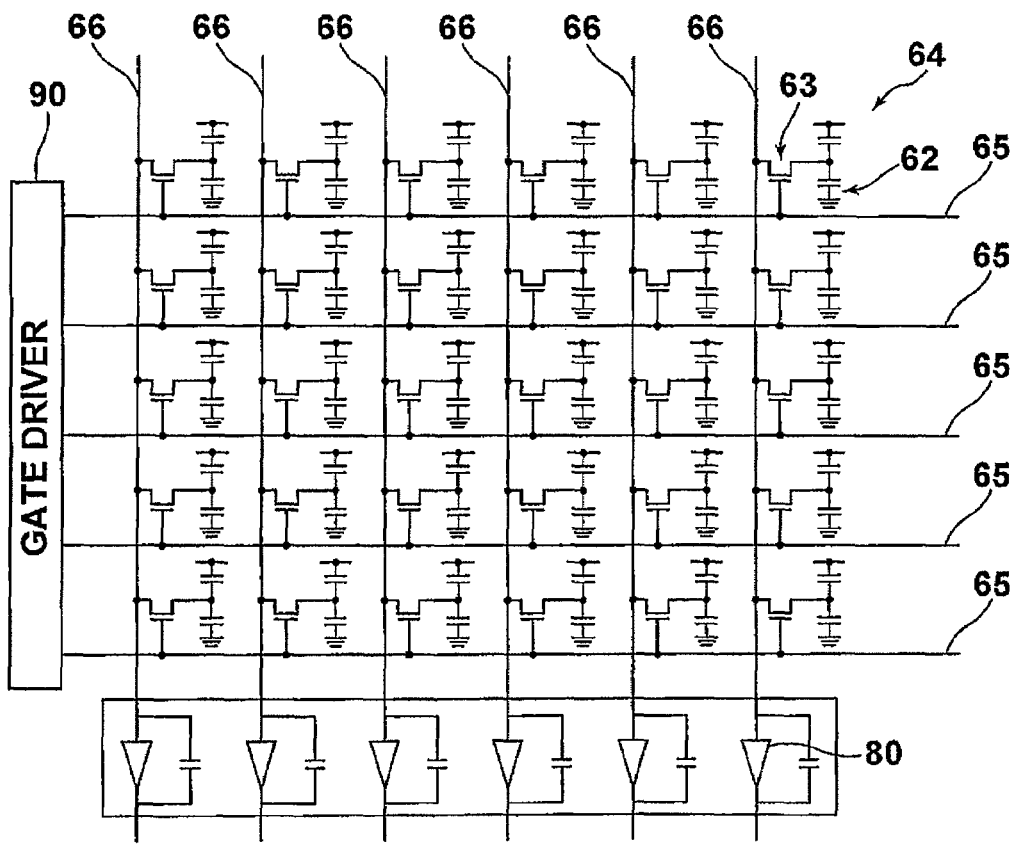
FIG. 13 is a plan view of an active matrix substrate in the radiation image detector according to the fifth embodiment.

FIG. 13 is a plan view of the active matrix substrate 60. As illustrated in FIG. 13, a multiplicity of pixels 64, each including the storage capacity 62 and TFT switch 63, are two-dimensionally arranged in the active matrix substrate 60. Further, the scan lines 65 and the data lines 66 are arranged in grid form. Further, a readout circuit 80 is connected to an end of each of the data lines 66. The readout circuit 80 includes an amplifier for detecting signal charges that have flowed from the data line 66. Further, a gate driver 90 for outputting controls signals for turning ON/OFF the TFT switches 63 is connected to the scan lines 65.

Meanwhile, when a radiation image is recorded in a conventional electric-readout-type radiation image detector as described above, a voltage is applied to the upper electrode. At this time, an electric field tends to concentrate in the vicinity of the edge portion of the upper electrode. Therefore, injection of charges from the upper electrode to the semiconductor layer occurs. Hence, there has been a problem that a fluctuation in density tends to occur at the edge portion of the radiation image. Further, there has been a risk of discharge breakdown by creeping discharge at the edge portion of the upper electrode.

Therefore, as illustrated in FIG. 12, in a radiation image detector 50 of the present embodiment, a charge injection prevention layer 73 is provided in such a manner to cover an edge portion 72a of the upper electrode 72. The charge injection prevention layer 73 is provided in an area from the side surface of the semiconductor layer 71 to the active matrix substrate 60. Further, a protruding electrode 74 is provided on the upper surface of the charge injection prevention layer 73. The protruding electrode 74 is provided in such a manner that the side surface 74a of an edge of the protruding electrode 74 is located on the outer side of the side surface 72b of the edge portion 72a of the upper electrode 72 and the side surface 74b of the other edge of the protruding electrode 74 is located on the inner side of the position of the side surface 72b of the edge of the upper electrode 72. In the present embodiment, the side surface 74b of the edge of the protruding electrode 74 is located on the inner side of the position of the side surface 72b of the edge of the upper electrode 72. However, the position of the side surface 74b of the protruding electrode 74 may be the same as that of the side surface 72b of the edge portion 72a of the upper electrode 72.

The charge injection prevention layer 73 prevents concentration of an electric field at the edge portion of the upper electrode 72. Further, the charge injection prevention layer 73 prevents injection of charges from the protruding electrode 74. As the material of the charge injection prevention layer 73, for example, when a positive voltage is applied to the upper electrode 72 and the protruding electrode 74, a material that can prevent injection of holes can be used. For example, polyparaxylylene, which is an insulating material, may be used. Alternatively, a material that prevents injection of holes and transfers electrons may be used. For example, a material obtained by adding a carbon cluster or a derivative thereof or a carbon nanotube to an organic high polymer may be used as the material. As the high polymer, polycarbonate may be used. Further, as the carbon cluster, at least one kind of clusters selected from the group consisting of fullerene $C_{60}$, fullerene $C_{70}$, fullerene oxide and derivatives thereof may be used.

The carbon cluster and the derivative thereof are aggregates (clusters) of carbon atoms that are formed by a few carbon atoms to several hundreds of atoms that bind with each other, regardless of the type of the carbon-carbon bond. The carbon cluster and the derivative thereof are not necessarily solely composed of carbon clusters. The carbon cluster and the derivative thereof may contain other atoms mixed therein or a substituent. Further, the carbon cluster that is used as the material of the charge injection prevention layer 73 contains, for example, one or a few kinds of fullerenes.

The term "fullerene" is a generic name of a spherical or rugby-ball-shaped carbon cluster composed of sp2 carbon. Generally, the fullerene is known as $C_{60}$, $C_{70}$, $C_{76}$, $C_{78}$, $C_{84}$ and the like. In the present invention, these fullerenes may be used alone or as a mixture. Optionally, a mixture of $C_{60}$ and $C_{70}$ may be used. Further, fullerene oxide, which is an oxidized fullerene, may be used. As the fullerene oxide, a mixture of $C_{60}(O)_1$, $C_{60}(O)_2$, $C_{60}(O)_3$, and the like may be used.

Further, when a material that transfers electrons as described above is used, as the material of the charge injection prevention layer 73, instead of the insulating material, it is possible to prevent electrons that approach the upper electrode 72 during recording of the radiation image from accumulating within the semiconductor layer 71. Therefore, even if the radiation image detector is used repeatedly, it is possible to prevent discharge breakdown at the edge portion of the upper electrode 72. Further, since the organic high polymer material, such as polycarbonate, is used as described above, it is possible to prevent crystallization of the semiconductor layer 71, which is in contact with the charge injection prevention layer 73.

The material of the protruding electrode 74 is similar to the material of the radiation image detector 10 of the first embodiment.

Further, the protruding electrode 74 is provided along the outer circumference of the upper electrode 72. As illustrated in FIG. 12, the inner edge portion of the protruding electrode 74 contacts with the upper electrode 72. Therefore, a voltage similar to the voltage applied to the upper electrode 72 is applied to the protruding electrode 74.

Figure 14:
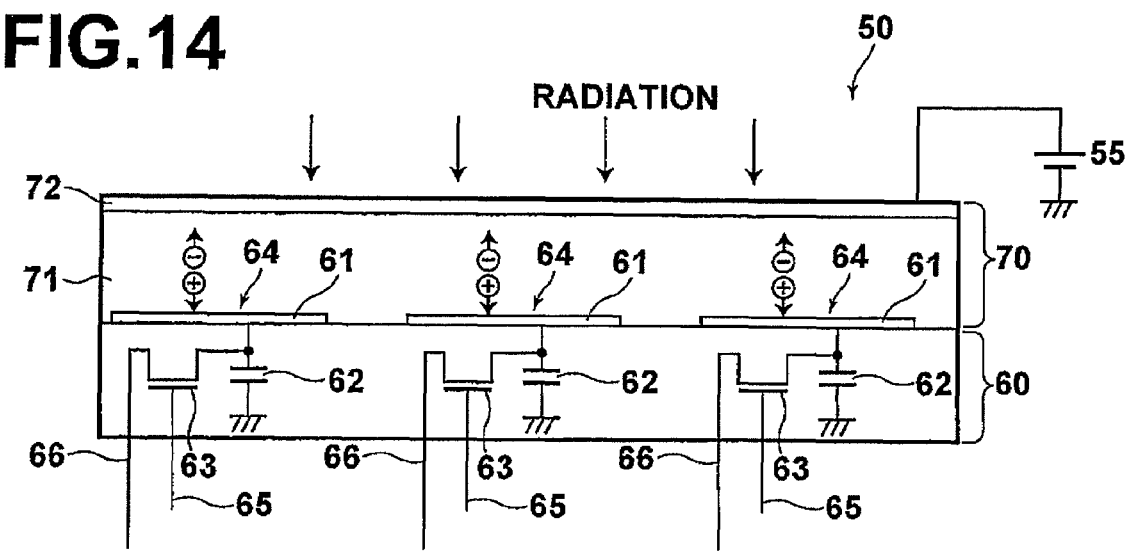
FIG. 14 is a diagram for explaining an action of recording a radiation image in the radiation image detector according to the second embodiment and an action of reading out the radiation image therefrom.

Next, the action of recording a radiation image in the radiation image detector of the fifth embodiment and the action of reading out the radiation image therefrom will be described with reference to FIG. 14. In FIG. 14, the charge injection prevention layer 73 and the protruding electrode 74 are omitted.

First, as illustrated in FIG. 14, a positive voltage is applied to the upper electrode of the radiation image detector 50 by a voltage source 55. Then, while the positive voltage is applied to the upper electrode, radiation that has passed through a subject, and which carries a radiation image of the subject, is output to the radiation image detector 50 from the upper electrode 72 side.

Then, the radiation that has been output to the radiation image detector 50 is transmitted through the upper electrode 72, and the semiconductor layer 71 is irradiated with the radiation. Then, dipoles are generated in the semiconductor layer 71 by irradiation with the radiation. The negative charges of the dipoles combine with positive charges charged in the upper electrode 72 and disappear, and the positive charges of the dipoles are collected, as latent image charges, by the collection electrode 61 of each of the pixels 64. Then, the collected charges are stored in each of the storage capacities 62. Accordingly, the radiation image is recorded.

Then, control signals for turning on TFT switches 63 are sequentially output from the gate driver 90, illustrated in FIG. 13, to each of the scan lines 65. Then, the TFT switches connected to each of the scan lines 65 are turned on based on the control signals output from the gate driver 90, and stored charges are read out from the storage capacity 62 of each pixel 64 to the data lines 66. Then, the charge signals that have flowed into the data lines 66 are detected, as image signals, by the charge amplifier of the readout circuit 80. Accordingly, image signals corresponding to the radiation image are read out.

As illustrated in FIG. 12, the charge injection prevention layer 73 is provided in the radiation image detector 50 of the present embodiment. Therefore, it is possible to prevent discharge breakdown that is caused by creeping discharge from the upper electrode 72. Further, since the protruding electrode 74 is provided, when a voltage is applied to the upper electrode 72, an electric field is generated also by the protruding electrode 74 in a manner similar to the radiation image detector of the first embodiment. Therefore, it is possible to suppress concentration of the electric field at the edge portion 72a of the upper electrode 72. Further, it is possible to prevent injection of charges from the edge portion 72a of the upper electrode 72. Hence, it is possible to suppress fluctuation in the density at the edge portion of the radiation image.

Further, in the electric-readout-type radiation image detector, the charge injection prevention layer and the protruding electrode that have similar shapes to those of the charge injection prevention layer and the protruding electrode that are provided in the light-readout-type radiation image detector may be provided. Further, the shapes of the charge injection prevention layer and the protruding electrode are not limited to those of the charge injection prevention layer and the protruding electrode in the radiation image detector of the fifth embodiment. The shapes of the charge injection prevention layer and the protruding electrode of the radiation image detectors in the second through fourth embodiments may be applied to the electric-readout-type radiation image detectors even without modification.

Further, in the above embodiments, radiation image detectors that directly convert radiation into charges, in other words, direct-conversion-type radiation image detectors have been described. However, the present invention is not limited to such radiation image detectors. The present invention may be applied to radiation image detectors that have structures similar to those of radiation image detectors that temporarily convert radiation into light using a phosphor and convert the light into charges, in other words, indirect-conversion-type radiation image detectors. In the radiation image detectors that have structures similar to those of the indirect-conversion-type radiation image detectors, the thickness of an a-Se layer is thinner than that of the a-Se layer in the direct-conversion-type radiation image detectors. Further, a light-transmissive first electrode is provided, and a phosphor is provided over the first electrode layer. The light from the phosphor is converted into charges. In the radiation image detectors that are structured as described above, the thickness of the photoconductive layer for recording and that of the semiconductor layer are approximately in the range of 1 to 30 µm. When the radiation image detector is a electric-readout-type radiation image detector, it is not necessary to provide the storage capacity.

Here, results of simulations of effects that will be obtained when the charge injection prevention layer and the protruding electrode are provided as in the radiation image detectors of the aforementioned embodiments will be described.

Figure 15:
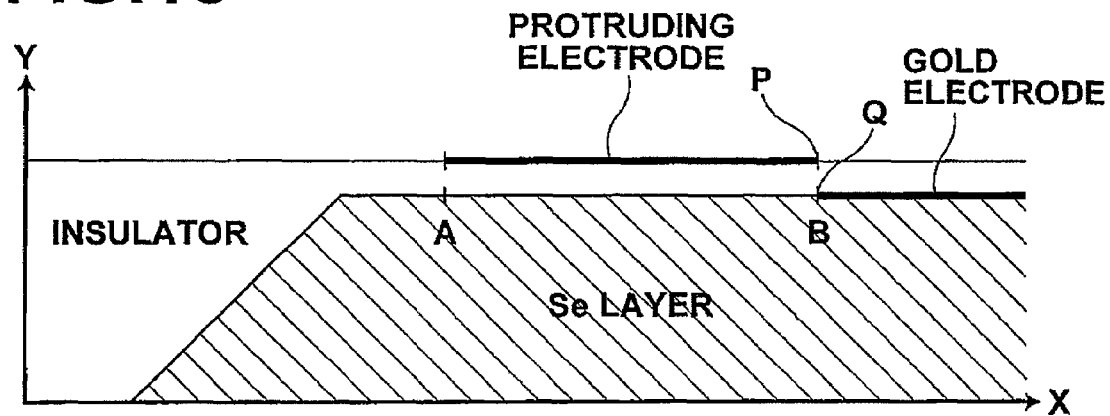
FIG. 15 is a diagram illustrating the structure of a radiation image detector that was used in simulations of the effect of the present invention.

The simulations were carried out by calculating an electric field at point A and an electric field at point B when a gold electrode to which a voltage is applied, an insulating material and a protruding electrode are provided on a Se layer, as illustrated in FIG. 15.

Figure 16:
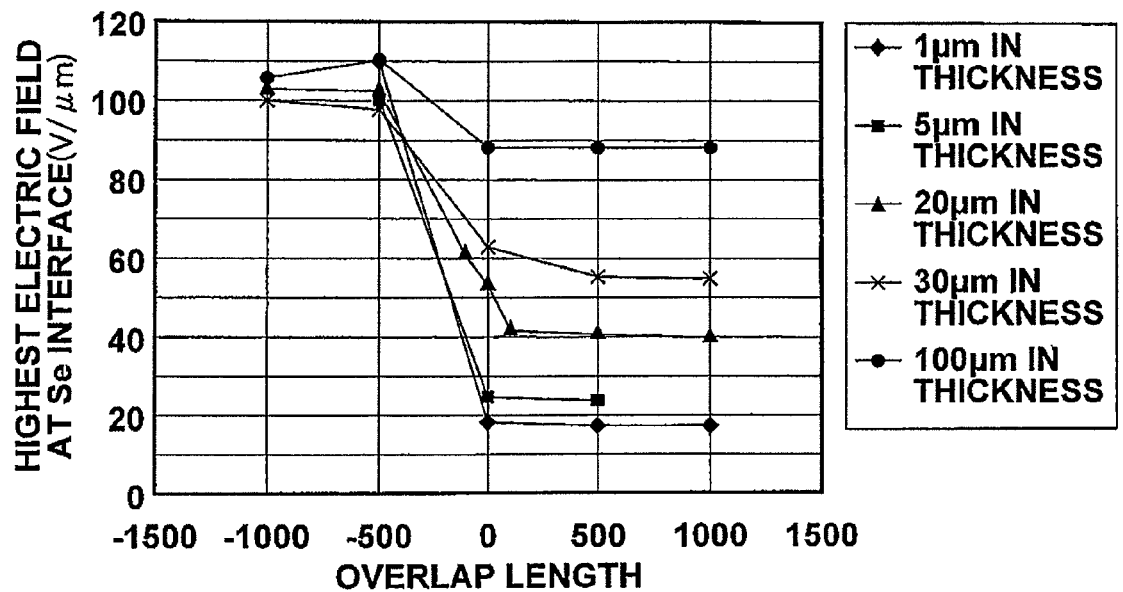
FIG. 16 is a diagram illustrating the results of simulations of the effect of the present invention.

FIG. 16 is a diagram illustrating the result of a computer simulation with regard to a change in the electric field (highest electric field at the Se interface) at point B with respect to a change in the overlap length between the protruding electrode and the gold electrode. The overlap length indicates the position of edge surface P of the protruding electrode with respect to the position of edge surface Q of the gold electrode. If the overlap length is 0, the position of the edge surface Q of the gold electrode with respect to X direction and the position of the edge surface P of the protruding electrode with respect to the X direction are the same. If the overlap length is positive, the position of the edge surface P of the protruding electrode with respect to X direction is located on the gold electrode side of the position of the edge surface Q of the gold electrode with respect to the X direction, in other words, within the gold electrode. If the overlap length is negative, the position of the edge surface P of the protruding electrode with respect to X direction is located on a side of the position of the edge surface Q of the gold electrode with respect to the x direction, the side being away from the gold electrode, in other words, on the outside of the gold electrode. Further, simulations were carried out for various cases by changing the thickness of the insulating material (the thickness of the insulating material between the protruding electrode and the gold electrode) from 1 µm to 100 µm. FIG. 16 is a diagram illustrating the results of simulations when the dielectric constant of the insulating material is 4.0.

As illustrated in FIG. 16, the results show that when the overlap length between the protruding electrode and the gold electrode is 0 or greater, it is possible to reduce the electric field at point B. Further, with regard to the thickness of the insulating material, the results show that the concentration of the electric field can be more efficiently suppressed when the thickness is thinner. When the thickness is in the range of 1 µm to 30 µm, it is possible to reduce the electric field at point B to approximately half, and a sufficient advantageous effect is achieved.

According to these results, it is desirable that the thickness of the charge injection prevention layer (the thickness of the charge injection prevention layer between the protruding electrode and the first electrode layer or the upper electrode) in the radiation image detectors of the first through fifth embodiments is less than or equal to 30 µm. Further, it is desirable that the overlap length between the protruding electrode and the first electrode layer or the upper electrode is greater than or equal to 500 µm. Further, it is desirable that the protruding electrode is provided in such a manner that it projects from the edge surface of the first electrode layer or the upper electrode by 500 µm or more.

Figure 17:
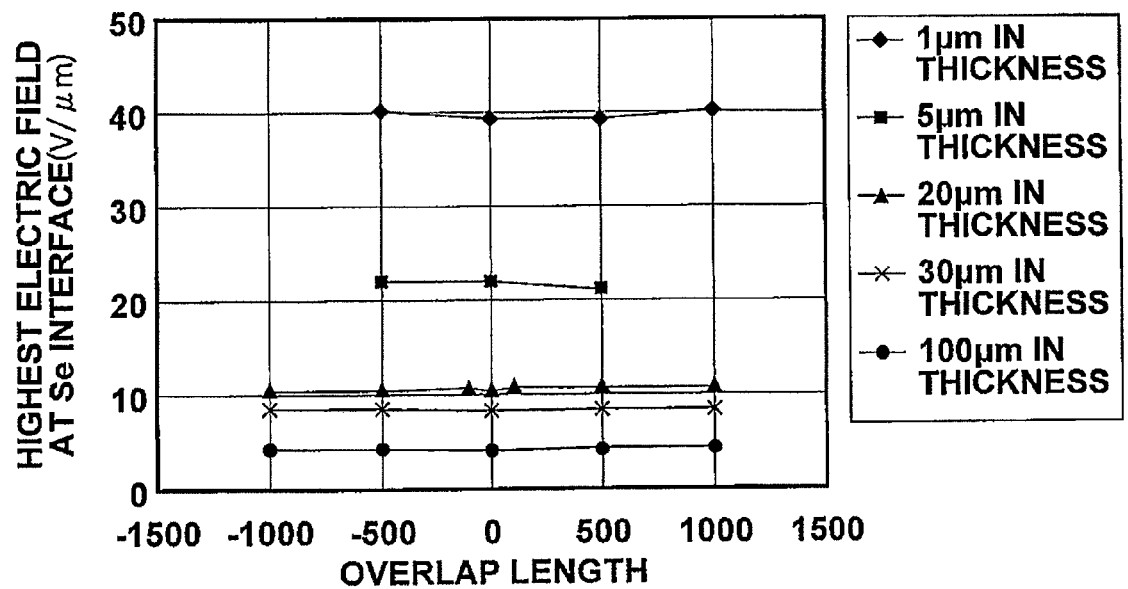
FIG. 17 is a diagram illustrating the results of simulations of the effect of the present invention.

FIG. 17 is a diagram illustrating results of simulations of a change in the electric field (highest electric field at the Se interface) at point A with respect to a change in the overlap length between the protruding electrode and the gold electrode. As illustrated in FIG. 17, the results show that if the thickness of the insulating material is greater than or equal to 1 µm, it is possible to sufficiently reduce the electric field at point A, regardless of the value of the overlap length. In other words, it is possible to sufficiently suppress injection of charges from the protruding electrode into the Se layer. Therefore, this result also shows that it is desirable that the thickness of the charge injection prevention layer (the thickness of the charge injection prevention layer between the protruding electrode and the first electrode layer or the upper electrode) in the radiation image detectors of the first through fifth embodiments is greater than or equal to 1 µm.

Figure 18:
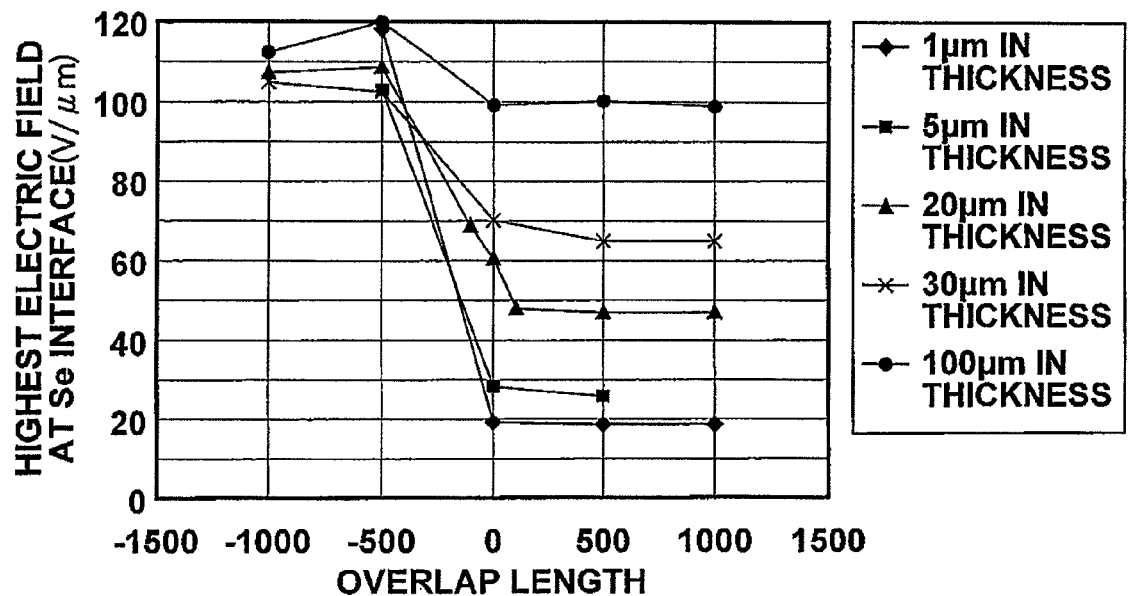
FIG. 18 is a diagram illustrating the results of simulations.
Figure 19:
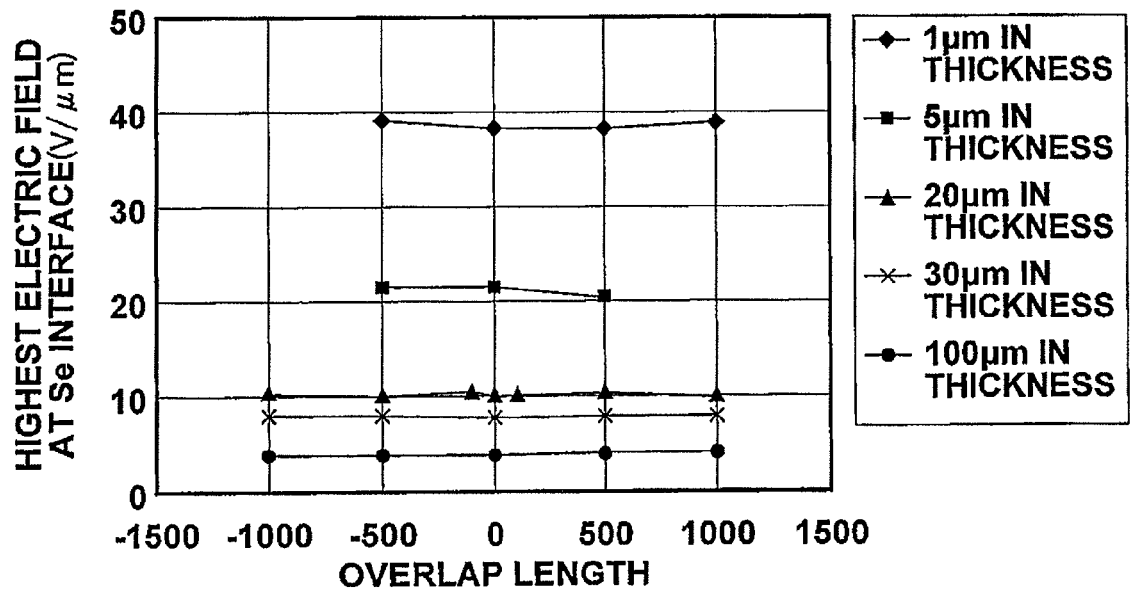
FIG. 19 is a diagram illustrating the results of simulations of the effect of the present invention.
Figure 20:
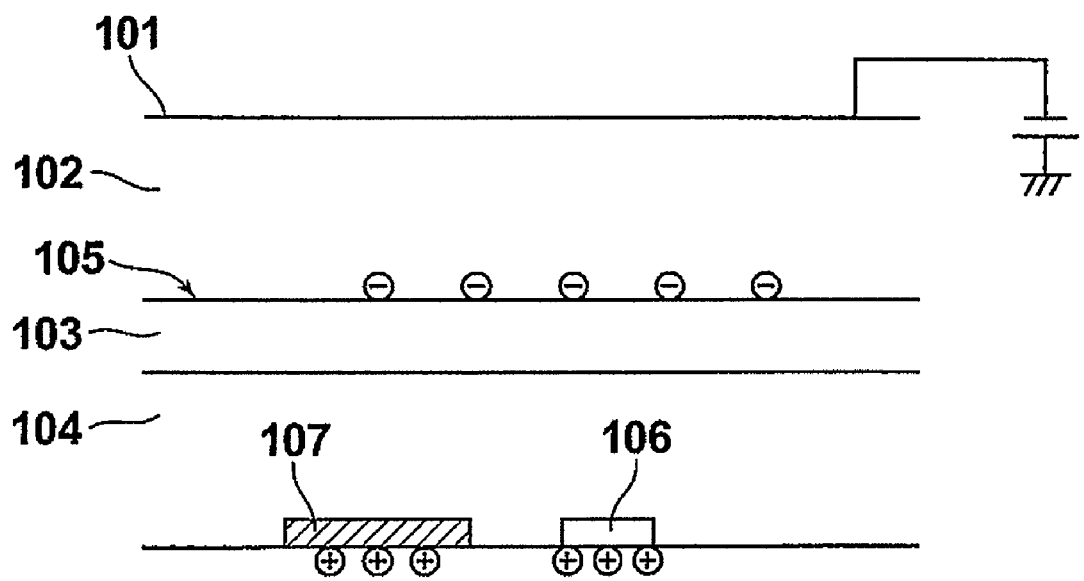
FIG. 20 is a diagram for explaining an action of recording a radiation image in a conventional radiation image detector and an action of reading out the radiation image therefrom.

FIGS. 18 and 19 show results of simulations when the dielectric constant of the insulating material is 3.0 in the structure illustrated in FIG. 15. A conclusion similar to the above conclusion is obtained from the results illustrated in FIGS. 18 and 19.

What is claimed is:

1. A radiation image detector comprising:
   a voltage-applied electrode, to which a voltage is applied;
   a semiconductor layer for generating charges by irradiation with radiation; and
   an electrode for detecting an electric signal corresponding to the dose of the radiation, which are superposed one on another, the radiation image detector further comprising:
   a charge injection prevention layer that covers at least the edge of the voltage-applied electrode; and
   a protruding electrode provided on the upper surface of the charge injection prevention layer, wherein the side surface of an edge of the protruding electrode is located on the outer side of the side surface of the edge of the voltage-applied electrode and the side surface of the other edge of the protruding electrode is located at the position of the side surface of the edge of the voltage-applied electrode or on the inner side thereof, wherein the protruding electrode is provided along the outer circumference of the voltage-applied electrode and is in contact with the voltage-applied electrode.

2. A radiation image detector, as defined in claim 1, wherein the thickness of the charge injection prevention layer is in the range of 1 µm to 30 µm.

3. A radiation image detector, as defined in claim 1, wherein the charge injection prevention layer is made of an insulating material.

4. A radiation image detector, as defined in claim 3, wherein the charge injection prevention layer is made of polyparaxylylene.

5. A radiation image detector, as defined in claim 1, wherein a negative voltage is applied to the voltage-applied electrode, and wherein the charge injection prevention layer prevents injection of electrons from the voltage-applied electrode to the semiconductor layer and transfers holes.

6. A radiation image detector, as defined in claim 5, wherein the charge injection prevention layer is made of a material obtained by adding a hole transfer material to an organic high polymer material.

7. A radiation image detector, as defined in claim 6, wherein the organic high polymer material is polycarbonate.

8. A radiation image detector, as defined in claim 6, wherein the hole transfer material is TPD (N,N'-diphenyl-N,N'-bis-(3-methylphenyl)-1,1'-biphenyl-4,4'-diamine).

9. A radiation image detector, as defined in claim 1 wherein a positive voltage is applied to the voltage-applied electrode, and wherein the charge injection prevention layer prevents injection of holes from the voltage-applied electrode to the semiconductor layer and transfers electrons.

10. A radiation image detector, as defined in claim 9, wherein the charge injection prevention layer is made of a material obtained by adding an electron transfer material to an organic high polymer material.

11. A radiation image detector, as defined in claim 10, wherein the organic high polymer material is polycarbonate.

12. A radiation image detector, as defined in claim 10, wherein the electron transfer material is a carbon cluster or a derivative thereof or a carbon nanotube.

13. A radiation image detector, as defined in claim 12, wherein the carbon cluster is at least one kind of carbon cluster selected from the group consisting of fullerene $C_{60}$, fullerene $C_{70}$, fullerene oxide and derivatives thereof.

14. A radiation image detector comprising:
a voltage-applied electrode, to which a voltage is applied;
a semiconductor layer for generating charges by irradiation with radiation; and
an electrode for detecting an electric signal corresponding to the dose of the radiation, which are superposed one on another, the radiation image detector further comprising:
a charge injection prevention layer that covers at least the edge of the voltage-applied electrode; and
a protruding electrode provided on the upper surface of the charge injection prevention layer, wherein the side surface of an edge of the protruding electrode is located on the outer side of the side surface of the edge of the voltage-applied electrode and the side surface of the other edge of the protruding electrode is located at the position of the side surface of the edge of the voltage-applied electrode or on the inner side thereof, wherein the protruding electrode is provided in the entire area of the voltage-applied electrode and is in contact with the voltage-applied electrode.

15. A radiation image detector comprising:
a voltage-applied electrode, to which a voltage is applied;
a semiconductor layer for generating charges by irradiation with radiation; and
an electrode for detecting an electric signal corresponding to the dose of the radiation, which are superposed one on another, the radiation image detector further comprising:
a charge injection prevention layer that covers at least the edge of the voltage-applied electrode; and
a protruding electrode provided on the upper surface of the charge injection prevention layer, wherein the side surface of an edge of the protruding electrode is located on the outer side of the side surface of the edge of the voltage-applied electrode and the side surface of the other edge of the protruding electrode is located at the position of the side surface of the edge of the voltage-applied electrode or on the inner side thereof, wherein the protruding electrode is provided along the outer circumference of the voltage-applied electrode and is not in contact with the voltage-applied electrode, and wherein a voltage that has the same polarity as that of the voltage applied to the voltage-applied electrode is applied to the protruding electrode.

16. A radiation image detector comprising:
a voltage-applied electrode, to which a voltage is applied;
a semiconductor layer for generating charges by irradiation with radiation; and
an electrode for detecting an electric signal corresponding to the dose of the radiation, which are superposed one on another, the radiation image detector further comprising:
a charge injection prevention layer that covers at least the edge of the voltage-applied electrode; and
a protruding electrode provided on the upper surface of the charge injection prevention layer, wherein the side surface of an edge of the protruding electrode is located on the outer side of the side surface of the edge of the voltage-applied electrode and the side surface of the other edge of the protruding electrode is located at the position of the side surface of the edge of the voltage-applied electrode or on the inner side thereof, wherein the protruding electrode is provided in the entire area of the voltage-applied electrode and is not in contact with the voltage-applied electrode, and wherein a voltage that has the same polarity as that of the voltage applied to the voltage-applied electrode is applied to the protruding electrode.

* * * * *